United States Patent
Corveleyn et al.

(10) Patent No.: US 9,803,039 B2
(45) Date of Patent: Oct. 31, 2017

(54) FLUOROPOLYETHER-BASED ELASTOMERS HAVING LOW GLASS TRANSITION TEMPERATURE

(71) Applicant: 3M INNOVATIVE PROPERTIES COMPANY, St. Paul, MN (US)

(72) Inventors: Steven G. Corveleyn, Knokke-Heist (BE); Gregg D. Dahlke, Saint Paul, MN (US); Rudolf J. Dams, Antwerp (BE); Werner M. A. Grootaert, Oakdale, MN (US); Miguel A. Guerra, Woodbury, MN (US); Anthony P. Manzara, Lake Elmo, MN (US); Tom Opstal, Laarne (BE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 169 days.

(21) Appl. No.: 14/433,005

(22) PCT Filed: Sep. 30, 2013

(86) PCT No.: PCT/US2013/062605
§ 371 (c)(1),
(2) Date: Apr. 1, 2015

(87) PCT Pub. No.: WO2014/055406
PCT Pub. Date: Apr. 10, 2014

(65) Prior Publication Data
US 2015/0259450 A1 Sep. 17, 2015

Related U.S. Application Data

(60) Provisional application No. 61/708,918, filed on Oct. 2, 2012.

(51) Int. Cl.
| | | |
|---|---|---|
| *C08G 65/333* | (2006.01) | |
| *C08G 65/332* | (2006.01) | |
| *C08K 3/36* | (2006.01) | |
| *C08G 18/50* | (2006.01) | |
| *C08G 18/80* | (2006.01) | |
| *C08G 65/325* | (2006.01) | |
| *C08F 122/38* | (2006.01) | |
| *C08G 65/00* | (2006.01) | |
| *C08K 3/16* | (2006.01) | |
| *C09K 3/10* | (2006.01) | |
| *C08K 5/00* | (2006.01) | |
| *C08K 5/28* | (2006.01) | |

(52) U.S. Cl.
CPC ........ *C08F 122/38* (2013.01); *C08G 18/5015* (2013.01); *C08G 18/807* (2013.01); *C08G 65/00* (2013.01); *C08G 65/007* (2013.01); *C08G 65/325* (2013.01); *C08G 65/332* (2013.01); *C08G 65/333* (2013.01); *C08G 65/33365* (2013.01); *C08K 3/16* (2013.01); *C08K 3/36* (2013.01); *C09K 3/1009* (2013.01); *C08K 5/0025* (2013.01); *C08K 5/28* (2013.01); *C09K 2003/1053* (2013.01)

(58) Field of Classification Search
CPC .................................................... C08G 65/333
See application file for complete search history.

(56) References Cited

U.S. PATENT DOCUMENTS

| | | | |
|---|---|---|---|
| 3,125,599 A | 3/1964 | Warnell | |
| 3,250,808 A | 5/1966 | Moore | |
| 3,347,901 A * | 10/1967 | Fritz et al. ......... | C08G 73/0655 528/361 |
| 3,392,097 A | 7/1968 | Gozzo | |
| 3,646,085 A | 2/1972 | Bartlett | |
| 3,699,145 A | 10/1972 | Sianesi | |
| 3,810,874 A | 5/1974 | Mitsch | |
| 4,567,301 A * | 1/1986 | Rosser ................. | C07D 251/24 564/243 |
| 4,647,413 A | 3/1987 | Savu | |
| 4,879,419 A | 11/1989 | Johannessen | |
| 5,545,693 A | 8/1996 | Hung | |
| 5,789,489 A | 8/1998 | Coughlin | |
| 6,716,534 B2 | 4/2004 | Moore | |
| 2004/0167290 A1* | 8/2004 | Grootaert .............. | C08F 214/18 525/326.2 |
| 2009/0105435 A1 | 4/2009 | Hung | |
| 2010/0014275 A1 | 1/2010 | Cranor | |
| 2010/0324222 A1 | 12/2010 | Hung | |
| 2011/0135861 A1 | 6/2011 | Manzara | |
| 2012/0009438 A1 | 1/2012 | Dams | |
| 2012/0028858 A1 | 2/2012 | Wadgaonkar | |

FOREIGN PATENT DOCUMENTS

| | | | |
|---|---|---|---|
| WO | WO 2010-115855 | 10/2010 | |
| WO | WO 2011-044093 | 4/2011 | |
| WO | WO 2011044093 A2 * | 4/2011 | ........... C08G 65/007 |
| WO | WO 2012-121898 | 9/2012 | |

OTHER PUBLICATIONS

International Search report for PCT International Application No. PCT/US2013/062605 mailed on May 23, 2014, 4pgs.

* cited by examiner

*Primary Examiner* — Nicole M Buie-Hatcher
(74) *Attorney, Agent, or Firm* — C. Michael Geise

(57) ABSTRACT

A curable precursor composition for a fluoroelastomers, methods of making fluoroelastomers, shaped articles and methods of making shaped articles.

12 Claims, No Drawings

FLUOROPOLYETHER-BASED ELASTOMERS HAVING LOW GLASS TRANSITION TEMPERATURE

FIELD

The present disclosure relates to curable precursor compositions of a fluoropolyether-based elastomers having low glass transition temperature, to fluoropolyether-based elastomers having low glass transition temperatures, methods of making them and to articles containing them.

BACKGROUND

Fluoroelastomers are widely used in the industry because they retain their elastomeric properties over a wide temperature range and have high resistance to heat, chemicals and fuels. For example, fluoroelastomers are used in the automotive or aircraft industry and in chemical processing where resistance to fuel is desired. Typically, polymers containing repeating units derived from fluorinated olefins are used for making fluoroelastomers, which subsequently are cured to gain elastomeric properties. These types of fluoroelastomers are typically solids and are cumbersome to process. Fluoroelastomers having good mechanical properties and low glass transition temperature may be prepared from a curable fluoropolyether composition by triazine-based cross-linking as described, for example in international patent application no. WO 2011/044093.

In many applications, it is desirable that the fluoroelastomers remain their elastomeric properties also at very low temperatures. In some applications materials may be exposed to temperatures below −40° C. or even below −100° C. for an extended period of time.

SUMMARY

In the following there is provided a curable precursor composition for a fluoroelastomer comprising
a) at least one functionalized fluoropolyether containing moieties selected from (—$C_4F_8O$—), (—$C_3F_6O$—), (—$C_2F_4O$—), (—$CF_2O$—) or combinations thereof, wherein the fluoropolyether is functionalised to contain at a terminal position or at a position that is adjacent to the terminal position at least one first functional group, and
b) one or more coagents comprising at least two second functional groups,
wherein the first and second functional groups are capable of reacting with each other in a curing reaction to form a fluoroelastomer, and wherein the first and second functional groups are selected from groups containing an alkyne unit or a nitrile unit on the one hand and groups containing an azide unit on the other hand.

In another aspect there is provided a composition comprising a cured fluoroelastomer obtained by curing the curable precursor as described above.

In yet another aspect there is provided a method of making a composition comprising a fluoroelastomer, said method comprising
i. providing a curable precursor as described above and
ii. subjecting the curable precursor to curing.

In a further aspect there is provided a shaped article obtained by molding the curable precursor as described above.

DETAILED DESCRIPTION

Before any embodiments of this disclosure are explained in detail, it is to be understood that the disclosure is not limited in its application to the details of compositions and the arrangement of components set forth in the following description. The invention is capable of other embodiments and of being practiced or of being carried out in various ways. Also, it is to be understood that the phraseology and terminology used herein is for the purpose of description and should not be regarded as limiting. Contrary to the use of "consisting", the use of "including," "containing", "comprising," or "having" and variations thereof is meant to be of broad scope and is meant to encompass the items listed thereafter, equivalents thereof and further items. The word "consisting of" is meant to be of limiting scope and is meant to encompass only the items listed thereafter and equivalents thereof but not any additional items. The term "consisting essentially of" has a meaning as defined in the description below.

The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

In the following there is provided a curable precursor composition that can be cured to make compositions comprising fluoroelastomers. The fluoroelastomers have low glass transition temperatures, typically lower than −40° C. The fluoroelastomers have sufficient mechanical strength to be used in the preparation of shaped articles. Due to the low glass transition temperatures of the fluoroelastomers, shaped articles may be prepared that remain flexible at low temperatures. The fluoroelastomers may typically have good resistance to hydrocarbons or solvents as can be seen by a low volume swell. The elastomers may also show good resistance to humidity, for example resistance to hot water or steam.

The curable precursor compositions comprise fluoropolyethers that are functionalised to contain at a terminal position or at a position that is adjacent to the terminal position at least one first functional group. The first functional group is capable of reacting with a second functional group of a coagent to link fluoropolyether molecules with the coagent to form an elastomeric fluoropolyether network. The result of the cross-linking reaction is a fluoropolyether-based fluoroelastomer. The first and second functional groups are selected from groups containing alkyne and/or nitrile units on the one hand and groups containing azides on the other hand. In a preferred embodiment, the fluoropolyethers comprise the alkyne and/or nitrile groups and the coagent comprises the azide groups.

By subjecting a composition containing the functionalized fluoropolyethers and coagents as described above to curing conditions the first and second functional groups are believed to react under the formation of tetrazole or triazole ring structures linking the polyethers to form a polymer network as the result of the curing reaction. Groups having a tetrazole ring structure can be represented by the general formulae

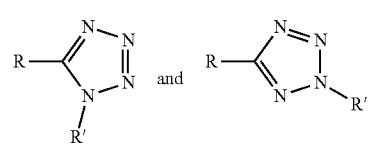

Groups having a triazole ring structure can be represented by the general formulae

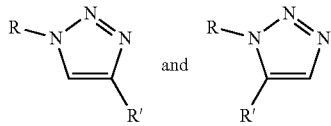

wherein in both cases, R and R' represent a chemical bond. The coagent is believed to be incorporated into or to form part of these ring structures. Since the coagent comprises more than one functional group the coagent may link two or more functionalised polyethers.

Curing may be achieved by subjecting the fluoropolyethers and coagents to a heat treatment, for example a heat-treatment of at least 40° C., or at least 50° C. Typically, the heat treatment involves temperatures of from about 80° C. to about 180° C.

In order to make a cross-linked network, the fluoropolyether as well as the co-agent preferably contain more than one functional group that can take part in the reaction. The resulting cured product typically contains fluoropolyether segments and typically heterocyclic ring segments formed during the reaction of the functional groups. The resulting cured products are elastomeric and as they contain, typically as a major component, fluoropolyether segments, they are also referred to as fluoropolyether-based elastomers.

The components and methods will now be described in greater detail.

Fluoropolyethers

A suitable fluoropolyether according to the present disclosure is a compound containing perfluoroalkylene oxo moieties selected from ($-C_4F_8O-$), ($-C_3F_6O-$), ($-C_2F_4O-$), ($-CF_2O-$) or combinations thereof. Examples include combinations of perfluoroalkylene oxo groups like ($-C_2F_4O-$) and ($-CF_2O-$); ($-C_4F_8O-$), ($-C_2F_4O-$) and ($-CF_2O-$); ($-C_4F_8O-$), and ($-C_2F_4O-$); ($-C_3F_6O-$) and ($-C_2F_4O-$). These units may be present in a random order.

Fluoropolyethers according to the present disclosure may have a linear backbone or they can be branched (in which case the backbone may comprise side chains). Side chains may be present, for example, if the fluoropolyethers contains branched ($-C_3F_6O-$) or branched ($-C_4F_8O-$) units rather than linear ($-C_3F_6O-$) or ($-C_4F_8O-$) units.

A fluoropolyether according to the present disclosure is functionalised to contain at a terminal position or at a position that is adjacent to the terminal position at least one first functional group that is capable of reacting with a second functional group of a coagent in a curing reaction to form a polymer network.

In a preferred embodiment the first functional groups are selected from (i) groups containing one or more nitrile units, and (ii) groups containing one or more alkyne unit.

Groups containing one or more nitrile units include nitriles as such and linking groups containing one or more nitriles. Typically, such linking groups may contain, in addition to the nitrile carbon, from 1 to 10 carbon atoms. The nitrile containing linking groups may be linear or branched, aliphatic or aromatic. Typically the linking groups are selected from alkylene nitrile groups. The linking groups may be non-fluorinated, fluorinated or perfluorinated. They may also contain oxygen or nitrogen atoms, preferably catenary oxygen or nitrogen atoms, i.e. atoms interrupting the carbon-carbon chain. The linking groups may contain one or more than one nitrile group. Specific embodiments of nitrile groups may be represented by the formula

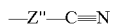

wherein Z" represents a chemical bond or a linking group, for example an alkylene group containing from 1 to 10 carbon atoms. Z" may be perfluorinated or non-fluorinated. It may contain one or more catenary oxygen atoms.

Groups containing an alkyne may be represented by the formula

wherein Z' represents a chemical bond or a linking group. Typically, such linking groups may contain, in addition to the alykne carbons, from 1 to 10 carbon atoms. The linking group may be linear or branched, aliphatic or aromatic. Typically, linking groups are selected from alkylene groups. The linking groups may be non-fluorinated, fluorinated or perfluorinated. They may also contain oxygen or nitrogen atoms, preferably catenary oxygen or nitrogen atoms, i.e. atoms interrupting the carbon-carbon chain. The linking groups may contain one or more than one alkyne group. Typical linking groups include alkylene groups having from 1 to 10 carbon atoms.

Groups Z' and Z" may optionally contain fluorine, chlorine, oxygen, nitrogen or sulphur atoms or combinations thereof, and include but are not limited to $-CH_2O-$, $-CH_2OC(O)-$, $-CH_2-O-NHC(O)-$, $-CH_2CH_2OC(O)-$, perfluoroalkylene (e.g., $-CF_2-$), perfluoorooxoalkylene (e.g., $-CF_2-O-$) and combinations thereof.

The fluoropolyether may also contain a combination of different functional groups. In a preferred embodiment, the functional groups are of the same type, e.g. the functional groups are all nitrile groups or alkyne groups.

At least one (preferably the majority or all) first functional group is positioned at a terminal position of the fluoropolyethers, or at a position adjacent to the terminal position. The term "terminal position" as used herein encompasses the terminal position of the backbone but may also include a terminal position of a side chain in case of non-linear fluoropolyethers.

Preferably, the fluoropolyethers contain two or more than two first functional groups, i.e. the fluoropolyethers are preferably bifunctional, trifunctional or polyfunctional.

In a preferred embodiment, the fluoropolyethers are perfluorinated. This means the fluoropolyethers contain, with the exception of the first functional groups, only carbon, oxygen and fluorine atoms.

Preferably, the fluoropolyethers consist essentially of units selected from ($-CF_2O-$), ($-C_2F_4O-$), ($-C_3F_6O-$) or ($-C_4F_8O-$), or a combination of one or more of ($-CF_2O-$), ($-C_4F_8O-$), ($-C_3F_6O-$) and ($-C_2F_4O-$) units. The term "consisting essentially of" as used herein means the compound contains at least 80 mole %, preferably at least 90 mole %, of the afore-mentioned units. The remainder of the backbone preferably includes functional groups and residues linking the functional groups with the perfluoroalkylene oxo groups described above.

Typical examples of functionalized fluoropolyethers include those represented by the general formula

wherein X and Y are the same or different first functional groups and A denotes a fluoropolyether segment, comprising or consisting only of perfluoroalkylene oxo groups selected from ($-C_4F_8O-$), ($-C_3F_6O-$), ($-C_2F_4O-$), ($-CF_2O-$) and combinations thereof.

Particular examples of functionalized fluoropolyethers can be represented by the formula:

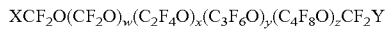

wherein X and Y independently from each other represent a first functional group, w, x, y and z are independent from each other integers from 0 to 30, with the proviso that w+x+y+z is at least 6 and wherein the perfluoroalkylene oxo units may be placed randomly. Preferably, X and Y represent independently a nitrile- or alkyne-containing residue. More preferably, X and Y represent a nitrile and/or an alkyne group.

Preferably, the polyether unit A comprises units selected from (—(CF$_2$)$_4$O—), (—(CF$_2$)$_2$O—), (—CF$_2$O—) or combinations thereof such as combinations of (—(CF$_2$)$_4$O—) and (—(CF$_2$)$_2$O—) units; (—(CF$_2$)$_4$O—), (—(CF$_2$)$_2$O—) and (—CF$_2$O—) units, (—(CF$_2$)$_2$O—) and (—CF$_2$O—) units; (—(CF$_2$)$_4$O—) and (—CF$_2$O—) units.

In one embodiment the fluoropolyether can be represented by the formula:

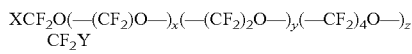

wherein x and y are independent from each other integers from 2 to 12 and wherein z is an integer from 0 to 12 and wherein the (—CF$_2$O—) and (—(CF$_2$)$_2$O—) units and (—(CF$_2$)$_4$O—) units if present may be placed randomly and wherein X and Y are the same or different first functional groups as described above.

In a preferred embodiment the functionalized fluoropolyether is linear.

The fluoropolyethers are typically liquid (at ambient conditions, i.e. 25° C. and 1 bar). Generally, they are also of low molecular weight. The fluoropolyethers generally may have a molecular weight of up to about 25,000 g/mole, or up to about 15,000 g/mole, typically from about 400 g/mole to about 15,000 g/mole, from about 1,200 to about 14,900, preferably from about 450 to about 9,000 g/mole. Examples include but are not limited to molecular weights of from about 410 g/mole to about 24,900 g/mole or from about 810 g/mole to about 14,900 g/mole. The fluoropolyethers may be mixtures and the molecular weight referred to above may be the average (e.g. number average) molecular weight of the mixture (as can be determined, for example, by size exclusion chromatography). Also mixtures of fluoropolyethers or perfluoropolyethers may be used. If mixtures are used, it is preferable that the weight percent of di- or multifunctional components is greater than 75%.

Fluoropolyethers as described above and their synthesis are known. For example, perfluoropolyethers having a backbone characterized by blocks of —CF$_2$CF$_2$O— units can be made from tetrafluoroethylene epoxide, as described in U.S. Pat. No. 3,125,599. Others, made by reacting oxygen with tetrafluoroethylene are characterized by a backbone made of repeating —CF$_2$O— units (see for example U.S. Pat. No. 3,392,097). Perfluoropolyethers having a backbone of —C$_3$F$_6$O— units in combination with —CF$_2$O— and —CF (CF$_3$)O— units are described for example in U.S. Pat. No. 3,699,145. Further useful examples of perfluoropolyethers include those having a backbone of repeating —CF$_2$O— and —CF$_2$CF$_2$O— units (as is disclosed in U.S. Pat. No. 3,810,874). Perfluoropolyethers can also be obtained by the polymerization of HFPO using dicarboxylic fluorides as polymerization initiators, as is described for example in U.S. Pat. Nos. 4,647,413 and 3,250,808. Perfluoropolyethers derived from HFPO contain branched perfluoroalkyl groups and at least one of the units (—C$_3$F$_6$O—) is not linear, e.g. the (—C$_3$F$_6$O—) is a —CF$_2$—CF(CF$_3$)—O— unit. HFPO derived perfluoropolyethers are also commercially available, for example, under the trade designation KRYTOX, available from DuPont de Nemours. Functionalized fluoropolyethers, in particular of the linear type are also commercially available, for example, under the trade designation of FOMBLIN, FOMBLIN Z DEAL from Solvay Solexis and DEMNUM from Daikin.

The conversion of functionalised fluoropolyethers into fluoropolyethers containing the first or second functional groups as listed above can be carried out by known methods of organic synthesis. For example, fluoropolyethers having nitrile functional groups can be obtained from the corresponding precursor perfluoropolyethers as described, for example, in U.S. Pat. Nos. 3,810,874, 4,647,413 or 5,545,693. By way of synthesis the precursor perfluoropolyethers typically have acid fluoride end groups. These acid fluoride end groups may be converted to esters via reaction with an appropriate alcohol (e.g. methanol). The esters may be subsequently converted to amides via reaction with ammonia. The amides may then be dehydrated to nitriles in an appropriate solvent (e.g. DMF) with pyridine and trifluoroacetic anhydride. Alternatively the amides may be dehydrated with other reagents such as P$_2$O$_5$ or PCl$_3$.

Fluoropolyethers having alkyne functional groups can be obtained, for example, from the reaction of a fluoropolyether ester with an amine containing an alkyne group such as described in U.S. Pat. No. 3,810,874.

It is an advantage of the present disclosure that a liquid composition can be used for making fluoroelastomers as this may allow or facilitate the use of injection molding processes. The curable precursor compositions may contain additives as will be described below in addition to the coagents although the presence of additives may not be necessary. For example, the viscosity of the precursor composition can be conveniently increased if necessary by adding fillers to create a more paste-like consistency.

Functionalized fluoropolyethers are preferably present in an amount of at least 30% by weight based on the weight of the curable composition. Typical amounts include at least 35% or at least 40% by weight, preferably at least 50% or at least 70% by weight based on the total weight of the curable composition.

Coagents

A suitable coagent according to the present disclosure contains at least two, preferably more than two, second functional groups. Suitable coagents may be fluorinated or non-fluorinated. Preferably, the second functional groups are azide-containing groups or azide (—N$_3$) groups. The second functional groups may be identical or different.

A suitable coagent according to the present disclosure can be represented by the general formula:

where n is an integer from 2 to about 12, preferably more than 2 and up to 6, G is a n-valent aromatic or aliphatic residue. It may be linear or branched, acyclic or cyclic. G may contain or consist of alkylenes, arylenes, aralalkylenes. G may be non-fluorinated, partially fluorinated or perfluorinated. Preferably, G is perfluorinated. G may contain functional groups such as halogens, hydroxyl, ammonium, ether, ester, urethane or other groups that do not interfere with the curing reaction.

The coagent may be a low molecular weight compound having a molecular weight of less than 5,500 g/mole or even less than 1,000 g/mole. Suitable coagents include oligomers containing repeating units, which may be arranged in a random order, having a molecular weight between 1,000 and 5,000 g/mole. Low molecular weight coagents may be preferred if fluoropolyether elastomers are to be prepared that have a high fluorine content.

Contrary to a curing catalyst, the coagent gets consumed and at least partially incorporated into the polymer structure generated in the curing reaction. Curing catalysts are not consumed or do not get incorporated into the polymer. It is to be understood that coagents may not be completely incorporated into the polymer. It may well be that some of the coagents may decompose or undergo side reactions or that only parts of the coagent gets incorporated.

Instead of a single coagent also a combination of different coagents may be used.

Examples of useful coagents include, but are not limited to: $CH_3CH_2C(OCH_2CH-OHCH_2N_3)_3$, $N_3CH_2CH_2O[CH_2CH(CH_2N_3)O]_6CH_3$, $CH_3CH_2C(CH_2OCH_2CHOHCH_2N_3)_3$ $CH_3CH_2C[CH_2(OCH_2CH(CH_2N_3))_2OCOCH_3]_3$, $CH_3CH_2C[CH_2OCH_2CH(CH_2N_3)OH]_3$, $CH_3CH_2C[CH_2(OCH_2CH(CH_2N_3))_2OH]_3$, $N_3CH_2CH_2OCH_2CH(OH)CH_2N_3$, polyurethane azides made by reaction of $N_3CH_2CH_2OH$ with polyisocyanate, tris-2-azido-ethyl trimesoate, hexane-1,6-bis-azidoethylurethane, polyoxyethylene bis azide, 1,8-diazidooctane, and combinations thereof.

Typically, from 0.1 to 30 parts, or from 1 to 25 parts of one or more coagents may be used per 100 parts fluoropolyethers (all based on weight). The amounts of fluoropolyethers and coagents may be adjusted such that the equivalent ratio of functional groups of the fluoropolyethers to the functional groups of the coagents is about 1 or less than 1, i.e., the functional groups of the coagents may be in excess over the functional groups of the fluoropolyethers. Also the type of fluoropolyethers and coagents may be adjusted to fine tune the mechanical properties of the resulting elastomers. A high cross-linking density which may be achieved by using highly functionalised coagents of low molecular weight may increase the tensile strength and hardness of the elastomer but may reduce its elasticity.

Additives

The curable composition may contain, alongside the functionalized fluoropolyether and coagent other ingredients like fillers or other additives.

Fillers:

Fillers are typically particles. The particles may be spherical or non-spherical particles. They may be rods or fibers. Typically the fillers are microsized materials. Typically they have a least one dimension being a length or a diameter of from about 0.01 µm or 0.05 µm up to about 5,000 µm, up to about 1,000 µm, or up to about 500 µm. Fillers, in particular carbon or silica-containing materials are available in particles sizes (number average) as small as between 0.05 and 30 µm.

Fillers include inorganic or organic materials. Typical fillers include silicone oxide containing materials. Examples of silicon oxide containing fillers include silicas (also referred to as silicon dioxides). Specific examples of silicas include hydrophilic and hydrophobic silica, fumed silica (which are, for example, commercially available under the trade designation "AEROSIL" from Evonik GmbH, Frankfurt, Germany, such as, for example, AEROSIL 200, AEROSIL R972 or AEROSIL R974; available under the trade designation "NANOGEL" from Cabot Corporation), silane-treated fumed silica (commercially available, for example, under the trade designation "CABOSIL" from Cabot Corporation) and combinations thereof. Further examples include silicates such as, for example, calcium silicates, aluminium silicates, magnesium silicates and mixtures thereof, such as for example mica, clays and glasses, such as for example glass spheres (commercially available under the trade designation "GLASSBUBBLES" from 3M Company). Further suitable fillers include nitrile-modified silica. Nitrile-modified silicas can for example be prepared by reacting a commercially available hydroxyl containing silica, such as, for example, AEROSIL 200V (available from Evonik), with a cyano-silane, such as, for example, 3-cyanopropyltriethoxysilane (available from Aldrich), in the presence of ethanol containing hydrochloric acid. The amount of reactants is chosen so as to obtain between 10 and 30% (by weight) of nitrile-modified silica. Further suitable silica-containing fillers include fluorine-modified silica. Fluorine-modified silicas can be prepared, for example, by reacting a commercially available hydroxyl containing silica, (for examples AEROSIL 200V) with a fluorosilane. A suitable fluorosilane includes HFPO-silanes, which may be prepared from oligomeric HFPO-esters and a silane, such as for example aminoalkyltrialkoxy silane, as is described in U.S. Pat. No. 3,646,085. Further suitable fluorosilanes can be derived from commercially available perfluoropolyethers, such as, for example, FOMBLIN Z Deal (Solvay Solexis) that have been reacted with aminoalkyltrialkoxy silanes, such as 3-aminopropyltrimethoxysilane, as is described in U.S. Pat. No. 6,716,534. The amount of reactants is typically chosen so as to obtain between 1 and 5% (by weight) of fluorine modified silica.

Other examples of suitable fillers include carbon materials. Carbon materials include, for example, carbon nanotubes, carbon black or subtypes thereof like, for example, acetylene black, modified carbons, such as, for example graphite fluoride (available, for example, from Central Glass) or Carbofluor (available from Advanced Research Co). Carbon black is commercially available, for example, from Cabot Corporation.

The fillers may be added in an amount between 2 to 50 parts, or between 6 and 30 parts, by weight per hundred parts by weight of fluoropolyethers (phr).

In a specific embodiment, the curable composition further contains one or more solid fluoropolymers. Typically, the fluoropolymers may be blended with the fluoropolyethers. The addition of the fluoropolymers may increase mechanical properties like tensile strength or hardness of the resulting elastomer composition, while the glass transition temperature of the resulting fluoropolyether segments containing elastomer remains low. Fluoropolymers may be added as fillers. Suitable fluoropolymers include those comprising repeating units derived from at least one, preferably at least two, fluorinated, preferably perfluorinated olefin. Useful fluoropolymers typically have a glass transition temperature below 25° C. Preferably, the fluoropolymers are amorphous, i.e. they are non-crystalline. Suitable perfluorinated olefins include those represented by the formula $CF_2=CY-R_f$, wherein Y is F, Cl or $CF_3$ and Rf is fluorine or a C1-C8 fluoroalkyl. Examples of suitable olefins include tetrafluoroethylene (TFE), hexafluoropropylene (HFP), and chlorotrifluoroethylene (CTFE). A particularly suitable olefin includes TFE. Preferably, the fluoropolymer comprises predominantly repeating units derived from TFE or from TFE and HFP. "Predominantly" means that repeating units derived from these monomers are the major component (by weight) of the polymer.

The fluoropolymers may further comprise interpolymerized units derived from one or more perfluorinated vinyl or allyl ethers. Suitable perfluorinated ethers include, for example CF$_2$=CF(CF$_2$)$_n$OCF$_3$, CF$_2$=CCF(CF$_2$)$_n$OCF$_2$OCF$_3$, CF$_2$=CF(CF$_2$)$_n$OCF$_2$OCF$_2$CF$_3$, CF$_2$=CF(CF$_2$)$_n$OCF$_2$OCF$_2$CF$_2$CF$_2$OCF$_3$, CF$_2$=CF(CF$_2$)$_n$—OCF$_2$CF$_2$OCF$_3$, CF$_2$=CF(CF$_2$)$_n$—OCF$_2$CF$_2$OCF$_3$, CF$_2$=CF(CF$_2$)$_n$—OCF$_2$CF$_3$, CF$_2$=CF(CF$_2$)$_n$—OCF$_2$CF(CF$_3$)OCF$_2$CF$_2$CF$_3$, and CF$_2$=CF(CF$_2$)$_n$OCF$_2$CF(CF$_3$)OCF$_2$CF(CF$_3$)OCF$_2$CF$_2$CF$_3$, CF$_2$=CF(CF$_2$)$_n$OCF$_2$OCF$_2$OCF$_3$ wherein n represents 1 (in case of allyl ethers) or 0 (in case of vinyl ethers).

The ether groups of the incorporated vinyl or allyl ethers are located in the side chains of the fluoropolymer. They are typically not part of the polymer backbone.

The fluoropolymers may optionally comprise repeating units derived from monomers that are non perfluorinated monomers, for example, partially fluorinated olefins or non-fluorinated olefins. Suitable monomers include those of the formula CY'$_2$=CY'—R, wherein each Y' independently represents, H, F or Cl, R is H, F, or a C1-C12, preferably C1-C3 alkyl group with the proviso that at least one Y' is not F. Suitable examples of partially-fluorinated monomers include vinylidene fluoride (VDF). Suitable examples of non-fluorinated hydrogen-containing monomers include hydrocarbon olefins, such as for example ethene, propene, butene, pentene, hexene, and the like.

Combinations of the above-mentioned optional monomers may also be used.

In a preferred embodiment, the fluoropolymer is perfluorinated, which means it is exclusively derived from perfluorinated monomers.

Useful fluoropolymers typically have Mooney viscosities (ML1+10 at 121° C.) of 1 to 150 units, suitably 1 to 100 units. The Mooney viscosity can be determined, for example, according to ASTM D-1646. The fluoropolymers may have a monomodal or bimodal or multi-modal weight distribution.

A particularly suitable fluoropolymer is a TFE-based fluoroelastomer. In particular, it may comprise of at least 20%, preferably at least 30% by mole of repeating units derived from tetrafluoroethylene. In addition, it may comprise at least one perfluorinated vinyl ether and a halogen containing monomer, preferably a perfluorinated iodine containing monomer.

In such copolymers, the copolymerized perfluorinated vinyl ether units constitute from about 1 to about 50 mole % (more preferably 10 to 40 mole %) of total monomer units present in the polymer.

The fluoropolymers can be prepared by free-radical polymerization of the monomers alone or as solutions, emulsions, or dispersions in an organic solvent or water. Polymerization in an aqueous emulsion or suspension often is preferred because of the rapid and nearly complete conversion of monomers, easy removal of the heat of polymerization, and ready isolation of the polymer. Emulsion or suspension polymerization typically involves polymerizing monomers in an aqueous medium in the presence of an inorganic free-radical initiator system, such as ammonium persulfate (APS) or potassium permanganate, and a surfactant or suspending agent.

Aqueous emulsion polymerization can be carried out continuously under steady-state conditions in which, for example, monomers, water, surfactants, buffers, and catalysts are fed continuously to a stirred reactor under optimum pressure and temperature conditions while the resulting emulsion or suspension is removed continuously (as is described, for example, in U.S. Pat. No. 5,789,489). An alternative technique includes batch or semi-batch polymerization. This type of polymerization involves feeding the ingredients into a stirred reactor and allowing them to react at a set temperature for a specified length of time or by charging ingredients into the reactor and feeding the monomer into the reactor to maintain a constant pressure until a desired amount of polymer is formed.

The fluoropolymers typically have a higher molecular weight than the fluoropolyether. Typically the fluoropolymers have a molecular weight (e.g. weight average) of at least 25,000 g/mole or at least 50,000 g/mole. The molecular weight may be determined by standard methods such a size exclusion chromatography. Typically, the fluoropolymer is solid at room temperature.

The weight ratio of fluoropolyether to fluoropolymer may vary between 2:3 up to 1:0. The minimum amount of fluoropolyether typically is at least 30% by weight based on the total weight of the curable composition.

In one embodiment the fluoropolymers are reactive fillers. In this case they further comprise at least one functional group capable of participating in the curing reaction mentioned above, e.g. the contain functional groups are as defined above and include nitrile, alkyne and azide groups. Preferably the functional group of the fluoropolymer comprises a nitrile. Nitriles can be introduced in the polymer chain by using nitrile containing monomers. Examples of nitrile containing monomers that may be used include: CF$_2$=CF—CF$_2$—O—Rf—CN; CF$_2$=CF—(CF$_2$—O)$_2$—Rf—CN; CF$_2$=CFO(CF$_2$)$_u$CN; CF$_2$=CFO[CF$_2$CF(CF$_3$)O]$_p$(CF$_2$)$_v$OCF(CF$_3$)CN and CF$_2$=CF[OCF$_2$CF(CF$_3$)]$_k$O(CF$_2$)$_u$CN, wherein r represents an integer of 2 to 12; p represents an integer of 0 to 4; k represents 1 or 2; v represents an integer of 0 to 6; u represents an integer of 1 to 6, Rf is a perfluoroalkylene or a bivalent perfluoroether group. Specific examples of nitrile containing fluorinated monomers include perfluoro (8-cyano-5-methyl-3,6-dioxa-1-octene) and CF$_2$=CFO(CF$_2$)$_5$CN, and CF$_2$=CFO(CF$_2$)$_3$OCF(CF$_3$)CN.

The amount of functional group containing monomers in the reactive fluoropolymers preferably ranges from at least about 0.001 mole %, more preferably at least about 0.01 mole %. The amount of functional group containing monomers in the fluoropolymer preferably ranges from greater than 0 to below about 5 mole %, more preferably below about 3 mole %.

The curable fluoropolyether compositions (and also the cured fluoropolyether compositions) may include further additives. Examples include pigments, antioxidants, processing aids, rheology modifiers, lubricants, flame retardants, flame retardant synergists, antimicrobials, and further additives known in the art of fluoropolymer compounding and rubber processing, like oxygen scavengers (e.g. metal oxides, for example, magnesium oxide and calcium oxide).

Where desirable, the crosslink density of the cured fluoropolyether polymers can be increased by adding a peroxide curing agent. The peroxide curing agent will cause crosslinking through the nitrile groups. Useful examples of peroxide curing agents include dicumyl peroxide.

Curing catalysts (typically metals or metal salts) may also be used but are not required. Curing catalysts may be added to accelerate the curing speed.

Methods of Making Fluoropolyether-Based Elastomers

To prepare the curable fluoropolyether compositions (or elastomer precursor compositions) the ingredients are intimately mixed. Known mixing devices such as, for example, rotary mixers, double planetary mixers, a high speed dispenser or a speed mixer available under the trade designation "Hauschild Speedmixer" may be used. Fillers and other additives may be added to the curable compositions. The resulting mixture may then be subjected to curing. Curing is typically achieved by heat-treatment. Optimum conditions can be tested by examining the resulting cured polymer for its mechanical and physical properties. Typically, the curing is carried out at a temperature of greater than 100° C., greater than 150° C., typically at least 177° C. Curing can be achieved by curing times between 3 and 90 minutes. Typically the curing is carried out over at least 30 minutes. The curing may be carried out at ambient pressure (1 bar), for example in an open mold. A pressure of 2 to 50 bar may be applied during the curing, for example, in a closed mold. A post cure may be applied, typically at a temperature greater 180° C. for 20 hours, preferably at ambient pressure.

The fluoropolyether compositions typically reach a maximum torque (MH-ML) (measured according to ASTM D 5289-93a) of greater than 1, preferably greater than 2.

The resulting polymers have low glass transition temperatures, for example glass transition temperatures of less than about −40° C., less than about −60° C., less than about −80° C. or even less than about −100° C.

The resulting polymers according to the present disclosure are elastomeric. They have an elongation at break of at least 50%. Preferably, the fluoropolyether-based polymers or polymer compositions have an elongation at break of at least 60%. Preferably, they have in addition also a shore A hardness of at least 15. More preferably, they have in addition also a tensile strength of greater than 1 MPa, preferably greater than 2 MPa.

The fluorpolyether-based elastomers show good resistance to exposure by humid heat. The fluoropolyether-based elastomers also show good resistance (low volume swelling) by exposure to hydrocarbons and solvents.

The fluoropolyether-based elastomers may have a fluorine content of greater than 45% by weight or even greater than 50% or greater than 60% by weight. Materials with high fluorine content can be prepared by choosing the amounts and ratio of the ingredients, for example by using perfluorinated materials, including fluorinated or perfluorinated coagents or by using low molecular weight coagents and comparatively high molecular weight or perfluorinated fluoropolyethers.

The cured fluoropolyether-based polymer or polymer compositions obtainable by the methods described herein may have one or more or all of the following properties:
(i) a glass transition temperature (Tg) of less than −60° C., preferably less than −70° C., more preferably less than −80° C. or less than −100° C.;
(ii) an elongation at break of at least 50%;
(iii) a tensile strength of greater than 1 MPa, preferably greater than 2 MPa;
(iv) a shore A hardness of at least 15, preferably at least 25 and more preferably at least 40;

Articles and Methods of Making Articles:

The curable compositions provided herein may be used to make shaped articles, for example, by molding. Conventional processing techniques used in fluoropolymer compounding or processing may be used, such as injection molding, in particular liquid injection molding, or compression molding. Alternatively, articles in the form of a sheet can be made by curing a layer of the fluoropolyether compositions in an open air oven. Such sheets can be further shaped by cutting or stamping methods. Compression molding typically comprises placing an uncured fluoropolyether—coagent composition into a heated mold cavity and subsequently closing the mold using adequate pressure to shape the article. After retaining the rubber-like material at sufficient temperature for sufficient time to allow vulcanization (curing) to proceed, it is typically demolded. Liquid injection molding is a shaping technique whereby the curable composition is pumped into a heated chamber from which it is then injected into a hollow mold cavity by hydraulic means (e.g. a piston). After vulcanization (curing) the shaped article is demolded.

The cured fluoropolyether-based polymers or compositions containing them are suitable for making shaped article, including shaped seals. Typical examples of suitable articles include articles, more particularly seals, having at least one surface facing or to be applied to face a liquid or gaseous hydrocarbon. Typically, the articles are components of a fuel management system comprising at least one fuel pump and/or at least one fuel injector, wherein the fuel preferably is a hydrocarbon. Examples of such components or suitable articles include O-rings, shaft seals, gaskets, tubes, linings, sheets, containers, lids, hoses or components thereof, membranes and bonded seals. Specific examples of articles include components of a fuel system as described above wherein the fuel system is the fuel system of a motor vehicle, an airplane, a helicopter, a rocket, a space shuttle, or a water craft. Other articles include a component of a satellite (including the articles described above).

Typical articles also include shaped seals in devices for storing hydrocarbons, compressing or liquefying gas, for example hydrocarbons, or expanding liquefied gas. Examples of such components or suitable articles in general include O-rings, gaskets, tubes, linings, sheets, containers, lids, hoses or components thereof, membranes and bonded seals. The curable compositions provided herein may be used to make articles for use in the liquefying gases and storing liquefied gases. Liquefied gases include He, Ne, natural gas and other hydrocarbons. Examples include but are not limited to LNG (liquefied natural gas), CNG (compressed natural gas), synthetic natural gas (CNG), liquid petroleum gas (LPG) and GTL gases (gas-to-liquid gases). The seals may have at least one surface facing or to be applied to face a liquid or gaseous hydrocarbon or noble gas or a mixture thereof. The seals, for example, may be components of valves. Examples of valves include ball valves, butterfly valves and the like. The valves may be components of coupling in liquefied gas terminal or in a processing unit to prepare liquefied gases, for example by expansion. Further examples include seals, or sealing components of valves, that are components of a liquefied gas storage device or a device for cooling gases by gas expansion. Examples include liquefied gas storage containers, for example for transport like shipping or by vessel or motor vehicles, or as storage unit in a liquefied gas terminal.

In the following list specific embodiments will be described to further illustrate the present disclosure. This list is provided for illustrative purposes only and is not meant to limit the present disclosure thereto.

1. A curable precursor composition for a fluoroelastomer comprising
a) at least one functionalized fluoropolyether containing moieties selected from ($—C_4F_8O—$), ($—C_3F_6O—$), ($—C_2F_4O—$), ($—CF_2O—$) or combinations thereof, wherein the fluoropolyether is functionalised to contain at a terminal position or at a position that is adjacent to the terminal position at least one first functional group, and
b) one or more coagents comprising at least two second functional groups,
wherein the first and second functional groups are capable of reacting with each other in a curing reaction to form a fluoroelastomer, and wherein the first and second functional groups are selected from groups containing an alkyne unit or a nitrile unit on the one hand and groups containing an azide unit on the other hand.

2. The curable composition of embodiment 1 wherein the fluoroelastomer has a glass transition temperature of less than −40° C.

3. The curable composition according to any one of embodiments 1 or 2 wherein the functionalized fluoropolyether has a molecular weight of from about 410 g/mole up to about 24,900 g/mole.

4. The curable composition according to any one of the preceding embodiments wherein the functionalized fluoropolyether has a molecular weight of from about 810 up to about 14,900 g/mole.

5. The curable composition according to any one of embodiments 1 to 4 wherein the functionalized fluoropolyether is represented by the formula

X-A-Y wherein X and Y are same or different first functional groups and A denotes a polyoxyperfluoroalkylene moiety comprising units selected from ($—C_4F_8O—$), ($—C_3F_6O—$), ($—C_2F_4O—$), ($—CF_2O—$) or combinations thereof.

6. The curable composition according to any one of embodiments 1 to 5 wherein the functionalized fluoropolyether is represented by the formula:

$XCF_2O(CF_2O)_w(C_2F_4O)_x(C_3F_6O)_y(C_4F_8O)_zCF_2Y$ wherein X and Y independently from each other represent a first functional group selected from
(i) an alkyne group of the general formula $—Z'—C≡CH$ wherein Z' represents a chemical bond or a linking group containing from 1 to 10 carbon atoms,
(ii) a nitrile group of the general formula $—Z''—C≡N,$ wherein Z'' represents a chemical bond or a linking group containing from 1 to 10 carbon atoms.

7. The curable composition according to any one of embodiments 1 to 6 wherein the coagent is represented by the formula:

$G(N_3)_n$ wherein n is an integer from 2 to about 10 and G is an aliphatic or aromatic residue.

8. The curable composition according to any one of embodiments 1 to 7 wherein the coagent has a molecular weight of less than 5000 g/mole.

9. The curable composition according to any one of the preceding embodiment 6, wherein the coagent has a molecular weight of less than 1000 g/mole.

10. The curable composition according to any one of embodiments 1 to 9 further comprising at least one filler selected from a silica-containing material, a carbon-containing material or a combination thereof.

11. The curable composition according to any one of embodiments 1 to 10 comprising at least 40% by weight based on the total weight of the composition of the functionalized fluoropolyether.

12. The curable composition according to any one of the preceding embodiments wherein the fluoroelastomer has an elongation at break of at least 50% and a tensile strength of at least 1 MPa.

13. A composition comprising a fluoroelastomer obtained by curing the curable precursor composition of any one of embodiments 1 to 12.

14. A method of making a composition comprising a fluoroelastomer said method comprising
i) providing a curable precursor according to any one of embodiments 1 to 13;
ii) subjecting the curable precursor to curing.

15. A shaped article obtained by molding the curable precursor composition according to any one of embodiments 1 to 13.

16. The shaped article according to embodiment 15 wherein the article is a seal or a component of a seal.

17. The shaped article according to embodiments 15 or 16, wherein the shaped article is a seal that is exposed at least by one surface to a liquid or gaseous hydrocarbon.

The following examples are provided to further illustrate the compositions and methods provided herein. These following examples are provided to illustrate certain embodiments but are not meant to limit the present disclosure thereto.

EXAMPLES

Test Methods
Hardness:
Hardness Shore A (2″) can be measured on post cured samples (20 hours, 250° C.) according to ASTM D-2240.
Tensile Strength and Elongation:
Tensile strength and elongation can be determined using an Instron™ mechanical tester with a 1 kN load cell in accordance with DIN 53504 (S2 DIE) at a constant cross head displacement rate of 200 mm/min.
Glass Transition Temperature (Tg):
Tg was measured by modulated temperature DSC using a TA Instruments Q200 modulated DSC, available from TA Instruments. Conditions of measurement: −150° C. to 50° C. @ 2 or 3° C./min, modulation amplitude of +−1° C./min during 60 sec. Reported is the midpoint Tg (° C.).
Curing Properties:
Vulcanisation behaviour and properties were measured using an Alpha Technologies Moving Die Rheometer (at 177° C. in accordance with ASTM D 5289-93a, reporting minimum torque (ML), maximum torque (MH) and delta torque (which is the difference between MH and ML). Torque values are reported in.lbs. Also reported are tg δ @ML and tg δ @MH. Further reported are parameters indicating the curing speed such as Ts2 (the time required to increase the torque by two units over the ML); T50 (the time to increase torque above ML by 50% of delta torque), and T90 (the time to increase torque above ML by 90% of delta torque), all of which were reported in minutes.
Sample Preparation
The curable precursors were in the form of a paste. They were prepared by mixing in a speedmixer available under the trade designation "Hauschild Speedmixer" (1 min at 2000 rpm, 1 min at 3500 rpm). The pastes were press cured in an Agila press (Agila PE 60 press from Agila NV in leper, Belgium, which is an example of a typical Rubber press with heated plates) under the curing conditions given in the examples below.
Materials Used:
Functionalised Fluoropolyethers (PFE)
PFE-1: $NCCF_2O(CF_2O)_{9-11}(CF_2CF_2O)_{9-11} CF_2CN$
PFE-1 was made starting from the perfluoropolyetherdiester $CH_3OC(O)CF_2O(CF_2O)_{9-11}(CF_2CF_2O)_{9-11} CF_2C(O)OCH_3$ (average molecular weight of about 2,000 g/mole, obtained under the trade designation "Fomblin Z-DEAL" from Solvay Solexis) according to the process described in U.S. Pat. No. 5,545,693, example 3. In a first step, the perfluoropolyether diester was converted to the corresponding dicarbonamide using ammonia gas. In a second step, the dicarbonamide was converted to the corresponding dinitrile.
PFE-2: PFE-dipropargylamide
HC≡C—CH$_2$NHC(O)CF$_2$O(CF$_2$O)$_{9-11}$(CF$_2$CF$_2$O)$_{9-11}$CF$_2$C(O)NHCH$_2$—C≡CH 200 g "FOMBLIN Z-DEAL" (Solvay Solexis, 0.0955 mole) was charged in a 250 ml glass flask assembled with mechanical stirrer, heating mantle, cooler and nitrogen supply. Then 10.52 g propargylamine (Aldrich 98%, 0.19 mole) was slowly added at room temperature. A slight exotherm at 35° C. was observed. A shift from 1798 to 1717 cm$^{-1}$ in C═O vibration was monitored in the IR-spectrum (FTIR). After 16 h a yield of 93 wt % di-amide was determined with H-NMR. An extra charge of 1 g propargyl amine was added and the mixture was further stirred during 4 h. Evaporating all volatiles with the rotavap (80° C., 1 h) resulted in 202.4 g end product. $^1$H-NMR revealed a purity of 97 wt % PFE-dipropargylamide.

Coagents
Azide 1: Polyisocyanate-Azide Adduct

In a three necked flask of 100 ml, fitted with a stirrer, condensor, thermometer and heating mantle, were charged 6.8 g Voronate M-220 (0.05 equiv) (polymeric aromatic polyisocyanate with NCO equivalent of 136, available from Dow), 10 g dry ethylacetate, 4.4 g (0.05 moles) 2-azidoethanol (available from Select Lab, Bonen, Germany) and 0.01 g dibutyltindilaureate (DBTDL catalyst, available from Aldrich). The mixture was reacted for 16 hours at 75° C. under nitrogen atmosphere. A clear, amber brown solution was obtained. Solvent was stripped off using a rotavapor at 40-50° C. and about 30 mm Hg.

Azide 2: Trimethylolpropane/Epichlorohydrine Adduct Azide (TMP Azide)

In a first step TMP-epichlorohydrin adduct is made based on the method as described in U.S. Pat. No. 4,879,419. 50 g (0.372 moles) trimethylolpropane (TMP (98%), available from Acros) was charged to a 500 ml flask which is assembled with heating mantle, mechanical stirrer, cooler and nitrogen supply. 20 ml heptane was added and stripped off to dry the polyol. Then 4.84 g (0.0186 moles) SnCl4 (available from Merck) and 10.6 g (0.093 moles) trifluoroacetic acid (available from Kali chemie) were added. The mixture was slowly warmed up to 60° C. and then 175 g (1.89 moles) dry epichlorohydrin (available from Acros) was added over 60 minutes. The reaction was stirred overnight at 70-75° C. The color changed to a light yellow solution.

A washing solution was made as followed: 450 g demineralised (demi) water was mixed with 50 g methanol, 11 g aqueous ammonium hydroxide solution (28-29% Aldrich), 6 g ethylenediamine tetra acetic acid (Aldrich, ACS grade) and 1.6 g sodium hydroxide (Aldrich >98%). The reaction mixture was washed with this solution in a separation funnel. The resulting organic phase was extracted twice with 100 g portions of 10% aqueous methanol solutions after which all volatiles were removed with the rotavap. 127.3 g of a viscous, yellow liquid was obtained. 1H-NMR (Bruker, 300 MHZ) revealed that on average 4.2 molecules of epichlorohydrine were added to one TMP molecule.

In a second step, TMP-epichlorohydrin-azide adduct was prepared. The synthesis was based on the method described in US2010014275. 25 g of the above TMP-epichlorohydrin adduct was charged to a 100 ml three neck flask assembled with heating mantle, cooler and addition funnel. The product was dissolved in 25 g DMSO (Merck pro analysis) and warmed up to 60° C. 11.7 g sodium azide (Aldrich >99.5%) was dissolved in 65 g DMSO and 21 g demineralised water. The azide mixture was slowly added over 3 h. The reaction mixture was stirred during 24 h at 80° C. after which a white precipitate was formed. After the reaction has completed 40 g ethylacetate was added. This mixture was three times washed with water. The solvent and water phase were removed by rotary evaporation. 1H-NMR revealed that 74 mol % of the chloride groups were substituted by azide functionalities.

Fillers
"NANOGEL": hydrophobic fumed silica, available from Cabot Corporation
"CARBOFLUOR 2065": fluorinated carbon black, available from Advanced Research Co.
"CAB-O-SIL" T530": hydrophobic fumed silica available from Cabot Corporation
"AEROSIL R200V": hydroxyl containing silica, commercially available from Evonik Examples Examples 1 to 3

In examples 1 to 3, pastes were made by mixing the ingredients as listed in table 1. The pastes were press cured at 177° C. for a time as given in table 1. The curing behaviour and properties of the fluoroelastomers obtained after curing the pastes are given in table 1.

TABLE 1

|  | Ex 1 | Ex 2 | Ex 3 |
|---|---|---|---|
| Composition of paste (parts per weight) | | | |
| PFE-1 | — | — | 100 |
| PFE-2 | 100 | 100 | — |
| AZIDE-1 | 21.4 | — | 23 |
| AZIDE-2 | — | 16.9 | — |
| NANOGEL | 8 | 8 | 10 |
| Vulcanisation behaviour | | | |
| Cure time (min) @177° C. | 45 | 45 | 40 |
| ML (inch · pounds) | 0.1 | 0.1 | 0.36 |
| MH (inch · pounds) | 2.7 | 5.69 | 2.55 |
| MH − ML (inch · pounds) | 2.6 | 5.59 | 2.19 |
| Ts2 (min.) | 8.59 | 4.08 | 30.38 |
| T50 (min.) | 7.03 | 5.12 | 25.67 |
| T90 (min.) | 9.87 | 29.04 | 30.17 |
| MDSC: | | | |
| Tg (° C.) | −115 | −115 | −115 |

Examples 4 to 7

In examples 4 to 7, pastes were made by mixing the ingredients as listed in table 2. The pastes were press cured at 177° C. for 45 or 60 min as given in table 2. The curing behaviour of the pastes is given in table 2.

TABLE 2

|  | Ex 4 | Ex 5 | Ex 6 | Ex 7 |
|---|---|---|---|---|
| Composition of paste (parts per weight) | | | | |
| PFE-1 | 100 | 100 | 100 | 100 |
| AZIDE-2 | 5 | 2.9 | 2.9 | 2.9 |
| NANOGEL | 8 | 8 | 6 | 6 |

TABLE 2-continued

| | Ex 4 | Ex 5 | Ex 6 | Ex 7 |
|---|---|---|---|---|
| CARBOFLUOR | — | — | — | 10 |
| CABO-SIL-T530 | — | — | 10 | 10 |
| Vulcanisation behaviour | | | | |
| Cure time (min) @177° C. | 45 | 45 | 60 | 60 |
| ML (inch · pounds) | 0.1 | 0.27 | 0.23 | 1.05 |
| MH (inch · pounds) | 3.45 | 7.6 | 6.72 | 6.54 |
| MH − ML (inch · pounds) | 3.35 | 7.33 | 6.49 | 5.49 |
| tg δ @ML | 1.000 | 0.481 | 0.739 | 0.410 |
| tg δ @MH | 0.058 | 0.037 | 0.034 | 0.086 |
| Ts2 (min.) | 17.64 | 32.27 | 17.83 | 18.86 |
| T50 (min.) | 17.3 | 35.36 | 18.86 | 19.77 |
| T90 (min.) | 18.81 | 39.11 | 21.05 | 22.21 |

Examples 8 and 1-9

In examples 8 and 9, pastes were made by mixing the ingredients as listed in table 3. The pastes were press cured at a temperature and time as given in table 3. The curing behaviour and properties of the fluoroelastomers obtained after curing the pastes are given in table 3.

TABLE 3

| | Ex | Ex 9 |
|---|---|---|
| Composition of paste (parts per weight) | | |
| PFE-2 | 100 | 100 |
| AZIDE-2 | 14.7 | 13 |
| NANOGEL | 8 | 8 |
| AEROSIL 200V | — | 4 |
| Vulcaniation behaviour | | |
| Cure temp (° C.) | 177 | 150 |
| Cure time | 45 | 30 |
| ML (inch · pounds) | 0.11 | 0.55 |
| MH (inch · pounds) | 5.13 | 14.25 |
| MH − ML (inch · pounds) | 5.02 | 13.7 |
| tg δ @ML | 1.091 | 0.418 |
| tg δ @MH | 0.060 | 0.076 |
| Ts2 (min.) | 3.38 | 9.02 |
| T50 (min.) | 3.87 | 14.12 |
| T90 (min.) | 10.98 | 24.26 |
| Tg (° C.) | −116 | NA |

NA: not available

The invention claimed is:

1. A curable precursor composition for a fluoroelastomer comprising
   a) at least one functionalized fluoropolyether containing moieties selected from (—$C_4F_8O$—), (—$C_3F_6O$—), (—$C_2F_4O$—), (—$CF_2O$—) or combinations thereof, wherein the fluoropolyether is functionalised to contain at a terminal position or at a position that is adjacent to the terminal position at least one first functional group, and
   b) one or more coagents comprising at least two second functional groups,
   wherein the first and second functional groups are capable of reacting with each other in a curing reaction to form a fluoroelastomer, and wherein the first functional group is selected from the group consisting of an alkyne unit and a nitrile unit; and the second functional group is an azide unit, further wherein the composition comprises at least 40% by weight based on the total weight of the composition of the functionalized fluoropolyether.

2. The curable composition of claim 1 wherein the fluoroelastomer has a glass transition temperature of less than −40° C.

3. The curable composition of claim 1 wherein the functionalized fluoropolyether has a molecular weight of from about 410 g/mole up to about 24,900 g/mole.

4. The curable composition of claim 1 wherein the functionalized fluoropolyether has a molecular weight of from about 810 up to about 14,900 g/mole.

5. The curable composition of claim 1 wherein the functionalized fluoropolyether is represented by the formula

X-A-Y wherein X and Y are same or different first functional groups and A denotes a polyoxyperfluoroalkylene moiety comprising units selected from (—$C_4F_8O$—), (—$C_3F_6O$—), (—$C_2F_4O$—), (—$CF_2O$—) or combinations thereof.

6. The curable composition of claim 1 wherein the functionalized fluoropolyether is represented by the formula:

$XCF_2O(CF_2O)_w(C_2F_4O)_x(C_3F_6O)_y(C_4F_8O)_zCF_2Y$ wherein X and Y independently from each other represent a first functional group selected from
(i) an alkyne group of the general formula

—Z'—C≡CH wherein Z' represents a chemical bond or a linking group containing from 1 to 10 carbon atoms,
(ii) a nitrile group of the general formula

—Z"—C≡N, wherein Z" represents a chemical bond or a linking group containing from 1 to 10 carbon atoms,
further wherein w, x, y and z are independent from each other integers from 0 to 30, with the proviso that w+x+y+z is at least 6.

7. The curable composition of claim 1 wherein the coagent is represented by the formula:

$G(N_3)_n$ wherein n is an integer from 2 to about 10 and G is an aliphatic or aromatic residue.

8. The curable composition of claim 1 wherein the coagent has a molecular weight of less than 5000 g/mole.

9. The curable composition of claim 1 wherein the coagent has a molecular weight of less than 1000 g/mole.

10. The curable composition of claim 1 further comprising at least one filler selected from a silica containing material, a carbon-containing material or a combination thereof.

11. The curable composition of claim 1 wherein the fluoroelastomer has an elongation at break of at least 50% and a tensile strength of at least 1 MPa.

12. A method of making a composition comprising a fluoroelastomer said method comprising
   i) providing a curable precursor of claim 1;
   ii) subjecting the curable precursor to curing.

* * * * *

UNITED STATES PATENT AND TRADEMARK OFFICE
CERTIFICATE OF CORRECTION

PATENT NO. : 9,803,039 B2
APPLICATION NO. : 14/433005
DATED : October 31, 2017
INVENTOR(S) : Steven Corveleyn It is certified that error appears in the above-identified patent and that said Letters Patent is hereby corrected as shown below:

In the Specification

Column 4
Line 15, Delete "alykne" and insert -- alkyne --, therefor.
Line 29-30, Delete "perfluooroxoalkylene" and insert -- perfluorooxoalkylene --, therefor.

Column 10
Line 27, Delete "$(CF_2)_uCN$;" and insert -- $(CF_2)_rCN$; --, therefor.

Column 15
Line 23, Delete "condensor," and insert -- condenser, --, therefor.
Line 33, Delete "Epichlorohydrine" and insert -- Epichlorohydrin --, therefor.
Line 60, Delete "epichlorohydrine" and insert -- epichlorohydrin --, therefor.

Column 17
Line 34 (Approx.), Delete "Vulcaniation" and insert -- Vulcanization --, therefor.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*